United States Patent
Gubela

(10) Patent No.: US 12,138,873 B2
(45) Date of Patent: Nov. 12, 2024

(54) ELASTIC RETROREFLECTOR

(71) Applicant: Hans-Erich Gubela, Kappelrodeck (DE)

(72) Inventor: Hans-Erich Gubela, Kappelrodeck (DE)

( * ) Notice: Subject to any disclaimer, the term of this patent is extended or adjusted under 35 U.S.C. 154(b) by 386 days.

(21) Appl. No.: 17/525,546

(22) Filed: Nov. 12, 2021

(65) Prior Publication Data

US 2022/0066074 A1    Mar. 3, 2022

Related U.S. Application Data

(62) Division of application No. 16/250,357, filed on Jan. 17, 2019, now Pat. No. 11,215,740.

(30) Foreign Application Priority Data

Jan. 22, 2018 (DE) .................... 10 2018 101 291.8

(51) Int. Cl.
| | | |
|---|---|---|
| B29D 11/00 | (2006.01) | |
| F21S 41/33 | (2018.01) | |
| G01J 1/04 | (2006.01) | |
| G01J 1/42 | (2006.01) | |
| G02B 5/124 | (2006.01) | |

(52) U.S. Cl.
CPC .... B29D 11/00605 (2013.01); B29D 11/0074 (2013.01); F21S 41/337 (2018.01); G01J 1/0407 (2013.01); G01J 1/429 (2013.01); G02B 5/124 (2013.01)

(58) Field of Classification Search
CPC .......... B29D 11/00605; B29D 11/0074; G02B 5/124; F21S 41/337
See application file for complete search history.

(56) References Cited

U.S. PATENT DOCUMENTS

| | | |
|---|---|---|
| 3,716,445 A | 2/1973 | Lemelson |
| 3,744,117 A | 7/1973 | Heenan et al. |
| 3,817,596 A | 6/1974 | Tanaka |
| 3,873,184 A | 3/1975 | Heenan |
| 5,189,553 A | 2/1993 | Smith |
| 5,376,431 A | 12/1994 | Rowland |
| 5,706,132 A | 1/1998 | Nestegard et al. |

(Continued)

FOREIGN PATENT DOCUMENTS

| | | |
|---|---|---|
| DE | 44 10 994 C2 | 1/1996 |
| DE | 202 07 645 U1 | 10/2002 |

(Continued)

OTHER PUBLICATIONS

German Search Report in DE 10 2018 101 289.6, dated Sep. 21, 2018, with English translation of relevant parts.

(Continued)

*Primary Examiner* — Mathieu D Vargot
(74) *Attorney, Agent, or Firm* — Collard & Roe, P.C.

(57) ABSTRACT

A retroreflector includes an arrangement of triples, each having three side surfaces, which are disposed in the manner of a cube corner and stand approximately perpendicular on one another. The retroreflector can be produced from a carrier material by injection molding. An optical silicone resin is used as the carrier material. The retroreflector is based on triple mirrors that are both easily unmolded from a die and easily applied to curved surfaces even after unmolding or are usable for reflection of ultraviolet light.

2 Claims, 7 Drawing Sheets

(56) References Cited

U.S. PATENT DOCUMENTS

| | | |
|---|---|---|
| 7,135,671 B2 | 11/2006 | Gubela, Sr. |
| 8,247,263 B2 | 8/2012 | Braune et al. |
| 10,101,591 B2 | 10/2018 | Lauret |
| 2006/0007542 A1 | 1/2006 | Smith |
| 2006/0158736 A1 | 7/2006 | Bacon, Jr. |
| 2010/0277801 A1 | 11/2010 | Nakajima |
| 2010/0284080 A1 | 11/2010 | Mullen |
| 2011/0227238 A1 | 9/2011 | Mimura et al. |
| 2017/0068022 A1 | 3/2017 | Buoni |
| 2017/0321039 A1 | 11/2017 | Kuhn et al. |

FOREIGN PATENT DOCUMENTS

| | | |
|---|---|---|
| DE | 696 22 754 T2 | 4/2003 |
| DE | 102 16 579 A1 | 10/2003 |
| DE | 10 2005 009 066 A1 | 9/2006 |
| DE | 10 2012 022 418 A1 | 5/2014 |
| DE | 20 2014 102 938 U1 | 8/2014 |
| DE | 10 2014 212 918 A1 | 1/2016 |
| DE | 10 2014 223 785 A1 | 5/2016 |
| EP | 1 756 632 B1 | 7/2015 |
| EP | 2 927 580 A1 | 10/2015 |
| WO | 2015/145026 A1 | 10/2015 |
| WO | 2017/182171 A1 | 10/2017 |

OTHER PUBLICATIONS

German Search Report in DE 10 2018 101 291.8, dated Sep. 21, 2018, with English translation of relevant parts.

German Search Report in DE 10 2018 101 292.6, dated Sep. 21, 2018, with English translation of relevant parts.

DIN 67 520, Retro-reflecting materials for traffic safety: photometric evaluation, measurement and characterization of retroreflectors and retro-reflecting sheetings, Sep. 1982, 4 pages.

DIN EN 12899-3, Fixed vertical road traffic signs—Part 3: Delineator posts and retroreflectors, Feb. 2008, 28 pages.

P. R. Yoder, Jr., "Study of Light Deviation Errors in Triple Mirrors and Tetrahedral Prisms", Journal of the Optical Society of America, vol. 48, No. 7, Jul. 1958, pp. 496-499.

Partial European Search Report in EP 18 21 0406, dated May 15, 2019, with English translation of relevant parts.

Partial European Search Report in EP 18 21 0408, dated May 23, 2019, with English translation of relevant parts.

Complete European Search Report dated Aug. 28, 2019 in European Application No. 18210406.7 with English translation of relevant parts.

b.)

ELASTIC RETROREFLECTOR

CROSS REFERENCE TO RELATED APPLICATIONS

This application is a divisional of and Applicant claims priority under 35 U.S.C. §§ 120 of U.S. application Ser. No. 16/250,357 filed on Jan. 17, 2019, now U.S. Pat. No. 11,215,740, which claims priority under 35 U.S.C. § 119 from German Patent Application No. 10 2018 101 291.8 filed on Jan. 22, 2018, the disclosures of each of which are hereby incorporated by reference. A certified copy of priority German Patent Application No. 10 2018 101 291.8 is contained in parent U.S. application Ser. No. 16/250,357.

BACKGROUND OF THE INVENTION

1. Field of the Invention

The invention relates to improved production and easier use of retroreflective elements using triple construction.

The term retroreflector should be understood to mean optical elements that guide incident light that comes in at a specific angle range back to the light source, independent of the precise incidence angle. Certain deviations from the incidence direction of the beam reflected back are possible, in this regard, and in part are actually desirable. For example, deviations are desirable if light source and intended recipient of the reflected radiation are not situated in precise alignment, viewed from the reflector (here, as an example, an automobile headlight should be mentioned as the light source, along with the car driver as the recipient, having a clearly elevated position in comparison with the headlight, with reference to the road).

2. Description of the Related Art

Different types of retroreflectors are known. A known type of reflective elements or, stated more precisely, of retroreflective elements is represented, for example, by foils having embedded microbeads in front of a reflective layer.

Reflective elements that comprise one or more Cube Corner elements for retroreflection generally have a clearly higher degree of retroreflection and thereby degree of effectiveness than such microbead-based foils. Such a Cube Corner ("cube corner") consists, in this regard, of three surfaces that stand essentially perpendicular to one another, in each instance, and is therefore also called a triple. In this regard, a corresponding retroreflector generally comprises a plurality of such triples.

If, in this regard, the three triple surfaces do not stand precisely perpendicular to one another, the direction of at least part of the reflected light will deviate, by a certain amount, from the direction of the incident light, but this deviation can be advantageous for certain applications. The methods presented here also make it possible to design triples to meet the requirements of such applications, in custom-tailored manner.

Arrangements in which the three surfaces that are essentially perpendicular to one another, in each instance, are essentially square and of the same size are also very frequent. They then form a corner (in other words three surfaces that come together at a point) of a cube. Such a special triple shall be referred to as a Full Cube hereinafter. The spatial diagonal of this imaginary cube is formed by what is called the triple axis. If the light entry surface on which the triple is illuminated, in other words the aperture surface, is perpendicular to the triple axis, then in the case of a Full Cube, ideally 100% of the incident light will be reflected back in the starting direction in the case of light incidence parallel to the triple axis, and this reflection percentage results in a high degree of effectiveness of reflectors equipped with these triples.

If, up to the present, a retroreflector based on triple mirrors was to be applied to a curved surface, the rigid structure of the triple mirrors was a difficulty. In order to be able to affix triple mirrors at all, significant effort had to be made. DE 202 07 645 U1 (Applicant: IMOS Gubela GmbH) proposes a two-part hook-and-loop tape as a force equalization layer between a triple reflector and a cable. Curvatures with two directions of curvature, for example spheroid, toroidal, ellipsoidal, parabolic or hyperbolic curvatures have not been possible up to the present using usual retroreflectors based on triple mirrors, and also not using reflector foils.

Silicones have been gaining increasing importance as an optical material in recent times. An example of an optical silicone is described in DE 10 2014 223 785 A1 (Applicant: Wacker Chemie AG). Optical silicones generally have polydimethylsiloxane as their basic material.

Optical silicone has the advantage that it is elastic and also permits undercuts in production using injection molding. For example, a collimator having a bowl-type shape is known from WO 2015145026 A1 (Applicant: Gaggione Sas), which can be removed from a mold in spite of undercuts.

In particular in lighting of motor vehicles, silicone has been playing an ever greater role as a casting material for light-emitting diodes (LEDs). In DE 20 2014 102 938 U1, for example, a light is described, the conductor tracks of which are cast in silicone. This solution has the disadvantage that a retroreflector foil still has to be produced, in every case, and then has to be applied separately to a lighting apparatus for motor vehicles. Furthermore, an adhesive has to be used to apply the retroreflective surface (see, for example, paragraph of DE 20 2014 102 938 U1). There is therefore a need for the retroreflective surface to be directly integrated into a headlight component, without a separate foil being required.

SUMMARY OF THE INVENTION

It is proposed, according to the invention, to cast a retroreflector composed of triple mirrors in optical silicone.

It is an object of the present invention to make available a retroreflector based on triple mirrors, which can easily be unmolded from a die, on the one hand, but on the other hand can be easily affixed to curved surfaces, even after unmolding.

These and other objects are accomplished by means of a retroreflector according to one aspect of the invention, as well as by an integrated optical component according to another aspect of the invention, a forming die according to a third aspect of the invention, and by a production method according to a further aspect of the invention. The retroreflector according to the invention can advantageously be used in an optical sensor apparatus which has a light emitter for emitting ultraviolet light and a light receiver for receiving light emitted by the light emitter, wherein the retroreflector is disposed in the beam path of the light in such a manner that it retroreflects the light emitted by the light receiver. Advantageous further developments are discussed below.

A retroreflector according to the invention comprises an arrangement composed of a plurality of triples, each having three side surfaces. An arrangement should be understood to mean a regularly repeating pattern. Such a pattern can consist, for example in a top view, of regularly disposed hexagons or squares or tetrahedrons. Tetrahedrons, however, have a degree of reflection that is less by ⅓ than that of the other two geometries, due to the absence of reference surfaces.

Depending on the area of application, the side surfaces can be mirrored or based on the principle of total reflection. Due to absorption, mirrored triple surfaces have a lower degree of effectiveness than triple surfaces that are based on total reflection. Furthermore, mirrored surfaces behave differently with regard to polarized light. Total reflection, however, occurs only during a transition from an optically denser to an optical thinner material, so that the reflective triple surfaces are frequently affixed on a rear side, i.e. a side facing away from the light entry surface of a retroreflector.

In the case of an ideal retroreflector, the incident rays are supposed to be reflected back into themselves. For this purpose, the side surfaces of the retroreflector must stand precisely perpendicular on one another. Applications for wide-angle reflectors, for example, are also conceivable, however, in which a greater angle range of an incident beam must be covered. In this case, the surfaces stand only approximately perpendicular to one another. In other words, the surfaces enclose an angle between 85° and 95°, in particular between 89° and 91°, preferably between 89° 58' and 90° 2' relative to one another.

A retroreflector according to the invention can be produced by means of injection molding, from a carrier material. According to the invention, it is provided that an optical silicone resin is used as the carrier material.

Optical silicones usually consist of at least two components that must be brought into connection with one another so as to vulcanize or polymerize and cure. One of the components usually contains a platinum catalyst. In the case of injection-molding applications, it is advantageous if a silicone from the group of "liquid silicone rubber" (LSR) is used. Depending on the silicone that is used, a temperature that is elevated as compared with room temperature can accelerate curing. A suitable curing temperature is 150° C., for example. Pressure also accelerates curing.

Depending on the selection of the material, a retroreflector according to the invention is temperature-resistant within a broad working range. Within the working range, the retroreflector retains both its optical and its mechanical properties. In particular, the index of refraction changes only slightly within the working range. The effects of thermal expansion on the beam path can also be ignored within the working range. Typical lower limits of the working range lie between −60° C. and −40° C. Typical upper limits of the working range lie between 180° C. and 210° C.

The transmission properties as a function of the wavelength are dependent on the silicone used. For example, optical silicone can be non-transparent at wavelengths below 220 nm, have a transmissivity of at least 90% in the case of wavelengths in near ultraviolet (approximately 280 nm) at a thickness of 2 mm, and have a transmissivity of at least 95% in the range of visible light as well as in the near infrared range, at a thickness of 2 mm.

The index of refraction of optical silicones usually lies between 1.39 and 1.51 in the range of visible light. At wavelengths of 400 nm, a typical value for the index of refraction is 1.45; at wavelengths of 630 nm, it is 1.41. In particular, the boundary angle of total reflection that is important for retroreflectors lies in the range of reflectors usually produced from polymethyl methacrylate (PMMA) or polycarbonate (PC), so that when using an optical silicone for the retroreflector according to the invention, no additional reflective coatings are required.

Optical silicones have typical hardness values between 40 Shore A and 85 Shore A in the vulcanized state. The silicones also differ in the manner in which they are to be cured or vulcanized. Some silicones must cure under UV-light; in the case of others, it is sufficient to join the components together and to increase the temperature to approximately 150° C. A person skilled in the art will be able to adapt the material selection and the curing conditions to his/her needs, and, in the case of commercially available optical silicones, find them in the data sheets.

The retroreflector according to the invention can also be an integral part of an integrated optical component.

A suitable forming die for production of a retroreflector according to the invention or an optical element that contains a retroreflector according to the invention comprises a die body. The die body is delimited by a die surface. The die body with its die surface is a negative of the retroreflector according to the invention, or of the optical element that contains the retroreflector. In other words, the die surface, like the retroreflector according to the invention, has a plurality of triples. Each triple has three forming surfaces, in each instance, that border on one another and intersect one another at an angle between 85 and 95 degrees, preferably between 89 and 91 degrees, particularly preferably between 89 degrees 58' and 90 degrees 2', wherein the forming surfaces of each triple contact one another at a triple center, through which the axis of symmetry of the respective triple runs.

When using an optical silicone in injection molding, measures have to be taken to ensure that the silicone cures only in the injection-molding die. For this purpose, the screw that presses the components into an injection-molding die must be kept at room temperature. If necessary, cooling might be required. In order for the silicone to be able to cure in the injection-molding die, it is necessary that the die body can be heated.

The die body of a forming die according to the invention has undercuts. As a result, the die body has at least one die element that stands perpendicular to an unmolding direction and prevents unmolding. The unmolding direction is understood to be the movement direction of a hydraulic element of an injection-molding machine. To state it differently, the tool body has at least one element that lies behind a cavity in the unmolding direction. This element stands in the way of unmolding. It is actually possible that the die body has a cavity behind a second cavity in the unmolding direction.

When using elastic materials (elastomers), for example silicones, the components can be pulled off over the die in spite of the undercut, because elastomer components can be elastically deformed under tension and pressure, in a certain parameter range, but after the forces have been terminated, they return to their original geometry. Attention must be paid to ensure that during unmolding, the elastic parameter range does not depart from a hysteresis curve of the silicone being used. It is advantageous to avoid plastic or permanent deformations. There are also embodiments, however, in which a deformation according to the hysteresis curve remains after unmolding, in targeted manner.

For production of a retroreflector according to the invention, the method of procedure is as follows:
 i. At least two components of an optical silicone as the injection-molding material are separately placed into an injection-molding machine in a volume ratio of 1:1.

ii. The components are mixed in a screw of an injection-molding machine and pressed into an injection-molding mold using the forming die. The screw must be kept at a temperature between 10° C. and 30° C., so that no curing takes place during transport into the mold.

iii. The components of the injection-molding material are pressed into an injection-molding mold. During this process, the injection-molding mold is heated to a temperature between 130° C. and 200° C.

iv. Due to the elevated temperature, the components cure in the injection-molding mold.

v. Subsequently, the retroreflector can be unmolded from the injection-molding mold.

According to an advantageous further development of a retroreflector according to the invention, the retroreflector is cast in a planar surface and adapted to the curvature of an object that is to be provided with the retroreflector according to the invention only after it has been produced. As a result, a base surface of the retroreflector assumes the shape of a curved surface of the object. Here, the elastic property of the material silicone is utilized. Use of a retroreflector has the advantage, as compared with a reflector foil composed of conventional foil material, that curvatures in two directions are also possible here. Thus, for example, a spherical, ellipsoid, toroidal, hyperbolic or parabolic-type object can be provided with a retroreflector according to the invention. The surface of the object can have a concave or convex curvature or even form a saddle. It is also conceivable to configure a reflector carrier to be very thin, and thereby make a transition to a reflector film composed of silicone.

According to another advantageous further development of a retroreflector according to the invention, the retroreflector can be produced in one piece on a curved surface. The surface can have undercuts. For some applications, it is advantageous if the surface is curved in two directions. The surface can be a spherical, ellipsoid, toroidal, hyperbolic or parabolic-type surface, for example, or can represent a different mathematical function with rotation symmetry, as a rotation body. The surface can have a concave or convex curvature, or can actually form a saddle.

For operation markers, for example, it is advantageous if the retroreflector comprises a spatial angle greater than $\pi$ steradian, particularly preferably a spatial angle greater than or equal to $2\pi$ steradian. Even such reflector geometries can still be unmolded in the case of production from silicone.

Geometries that are curved in only one direction, for example cylindrical or cone-shaped surfaces, are also conceivable. Undercuts occur starting from a polar angle greater than 135°. Particularly preferably, however, the retroreflectors according to the invention can still be unmolded from an injection-molding mold even at a polar angle greater than 180°.

It is a further aspect of the present invention that the shape of the curved surface is adapted to a predetermined first target shape, for example the shape of a headlight, but can also be used in a second target shape that can deviate from the first target shape. For example so as to use the retroreflector according to the invention in a slightly modified design, without having to produce a new injection-molding mold right away. For this purpose, it can be necessary to already depart from the elastic range of a hysteresis curve slightly during unmolding, and to adapt the retroreflector to the second target shape using an established force.

The side surfaces of the triples can be characterized, for example, by means of the following parameters: the enclosed angle of the side surfaces relative to one another, the length of the edges of the side surfaces, in particular the ratio of the edge lengths within a triple, the size of the triples, the angle of rotation of all the side surfaces of a triple about an axis that encloses the same angle relative to all the active edges of a triple, the tilt angle of the side surfaces of a triple, so that the axis that encloses the same angle relative to all the active edges of a triple no longer stands collinear to a normal line vector of a base surface of the triple. Active edges are edges that are formed by the intersection of two side surfaces of a triple, in each instance. In the case of curved surfaces, in this regard, the local normal line vector at the location of the triple is the deciding factor. The local normal line vector of a triple can be determined, for example, in that a plane is fitted through the local apices of the adjacent triple, the normal line vector of which plane corresponds to the local normal line vector.

The effects of small deviations of the angles of the side surfaces relative to one another from a right angle, for example by a few arc minutes, up to approximately 2°, have been described, for example, by P. R. Yoder Jr. in the article "Study of Light Deviation Errors in Triple Mirrors and Tetrahedral Prisms," Journal of the Optical Society of America, Vol. 48, No. 7, submitted on Jan. 2, 1958, published in July 1958. As described by Gubela in DE 102 16 579 A1, it can be practical for wide-angle applications to use triple surfaces having different sizes. For applications where illumination comes from the side, it can be practical to rotate the triple about the axis of the triple. An example of such a rotation is shown in FIG. 8 of DE 44 10 994 C2 (Applicant: Hans-Erich Gubela Senior). The axis passes through the apex, in other words the tip of the triple. Tilting of the side surfaces can be practical, for example, for marking buttons in road traffic, which are affixed at a slant (see, for example, DE 10 2012 022 418 A1, Applicant: Hans-Erich Gubela Senior), or, in general, for surfaces illuminated at a slant from above.

Usual widths across flats, in other words distances between two tips, for retroreflectors are 1 mm to 6 mm. Frequently, however, smaller and smaller triples are desirable. For example, smaller widths across flats are practical for sensor arrangements or for imaging systems in which a triple corresponds to a pixel. Smaller triple sizes additionally increase the elastic flexibility of a retroreflector according to the invention, because then, the triples are less in the way of one another.

Even injection-molding molds for widths across flats of less than 300 μm can be produced using new processes such as microsection cutting. Thereby retroreflectors having these widths across flats can also be produced using the injection-molding process. If one reduces the size of a triple, then diffraction effects can occur at small widths across flats and thereby also at small edge lengths.

Furthermore, it is advantageous if the axis defined above faces in the radial direction of the curved surface on which the retroreflector is cast or that corresponds to the curvature of the object on which the retroreflector is to be applied. As a result, the direction vector of the axis points to the center point of a circle that touches the curved surface, and the radius of which corresponds to the curvature radius of the curved surface. The reflection direction and thereby the perceived brightness adapts to the curvature.

According to a further aspect of the present invention, the retroreflector has at least two different regions. At least one triple can be assigned to each region. It is advantageous that a plurality of triples can be assigned to each region. Each region represents an arrangement of triples. The triples of the first region differ from the triples of the second region in at least one of the following parameters: the angle enclosed by the side surfaces relative to one another, the length of the edges of the side surfaces, in particular the ratio of the edge lengths within a triple, the size of the triples, the angle of rotation of all the side surfaces of a triple about the axis, the tilt angle of the side surfaces of a triple. This parameter can follow a predetermined mathematical function in one of the regions, for example, which function can depend on the curvature radius, a polar angle and/or an azimuth angle of the curved surface. Aside from interesting visual effects, use in safety elements, for example, or for marking curved objects or for marking objects for representation in "virtual realities" would be conceivable. The function can be calculated using a computer, in accordance with these requirements.

A preferred geometry, in particular in the case of variable parameters, is the strand geometry as described, for example, in DE 44 10 994 C2 (Applicant: Hans-Erich Gubela Senior). Using this geometry, it is possible to exert a direct influence on the production-technology structuring of the parameters, by way of the intersection angle.

It is advantageous if an integrated optical component having a retroreflector according to the invention is produced from a casting. In other words, the integrated optical component does not need to be welded, fused or connected in some other manner. Therefore no seams are present, either, which can worsen the optical properties of the component.

Such an integrated optical component can be, for example, a headlight element, in particular a headlight element for motor vehicles. It would then be unnecessary to additionally equip a headlight element with a retroreflective foil, for example. Instead, the triple is also produced during casting of a lighting means, such as a light emitting diode (LED) or a halogen lamp. A headlight element usually has a light exit surface. At the light exit surface, the light produced in the headlight exits into the surroundings. A surface that lies opposite the light exit surface can be referred to as the rear side. It is advantageous if a retroreflector according to the invention is situated on the rear side of the headlight element. Therefore light that falls into the headlight element can be reflected, and also light produced by the headlight can be guided in a desired direction. The triples can simultaneously increase the size of the surface if designed suitably, and thereby serve as cooling air channels for LEDs. In this regard, attention must be paid to ensure that cooling air channels are provided with a heat-conductive layer, because silicone, as a heat insulator, is not able to conduct heat away. At the surfaces that are not required for conducting heat, it is possible to do without mirroring, and the triples reflect on the basis of the internal total reflection.

Another example of an integrated optical component is an operation marker, for example. A physician can affix markers on the body part on which the operation is to take place, for example, and on instruments, so as to be able to precisely localize the position of his/her instruments on a monitor during the operation.

The retroreflector according to the invention can advantageously be used to retroflect ultraviolet light emitted by a light source, in particular having a wavelength of approximately 300 nm (near UV range) in a sensor apparatus, to a light recipient. Such sensor apparatuses can be used, in particular, for detection of crystal-clear objects in the visible range in the beam path.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
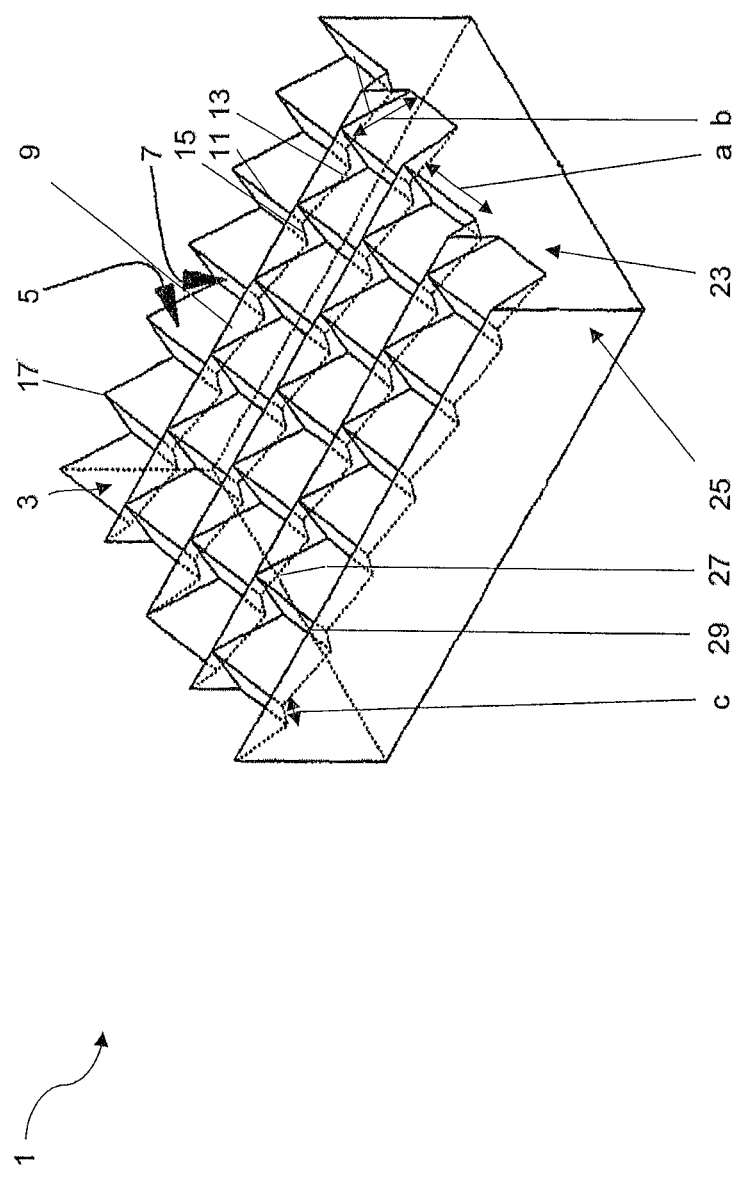
FIG. 1 shows a usual retroreflector geometry.

FIG. 1 shows a usual geometry of a retroreflector 1 as described in DE 102 16 579 A1, for example. The retroreflector 1 is formed by a regular arrangement of individual triples 3. Each triple 3 has three optically active boundary surfaces, at which a transition from an optically denser medium, in other words a material having a higher index of refraction, to an optically thinner medium, in other words a material having a lower index of refraction, or the opposite transition can take place. These boundary surfaces can also be referred to as first, second, and third side surfaces 5, 7, 9. In a usual geometry, light enters into the optically denser medium at a light entry surface that lies opposite the reflector side, and impacts the triples 3 at an angle at which total reflection takes place. The light beam is reflected once at each of the side surfaces 5, 7, 9. During each reflection, a component of the dispersion vector changes its sign. After triple reflection, the reflected light reflected beam 29 leaves the retroreflector 1 again, parallel to the direction of the incident beam 27.

In this regard, the surfaces 5, 7, and 9 enclose a right angle with one another. In the example of FIG. 1, the surfaces 5 and 7 intersect at the first edge 11 having the edge length a, the surfaces 5 and 9 intersect at the edge 13 having the edge length b, and the surfaces 7 and 9 intersect at the edge 15 having the edge length c. The intersection point of all three surfaces 5, 7, 9 forms the apex 17. An axis of symmetry 19 can be laid through the apex 17, which axis encloses the same angle with regard to all the side surfaces 5, 7, 9. As can be seen in FIG. 1, the triples 3 stand at a slight slant. In other words a tilt 23 is present. The axis 19 of the triples 3 is not parallel to a normal line vector of a plane 25 in which the triples are disposed.

Figure 2:
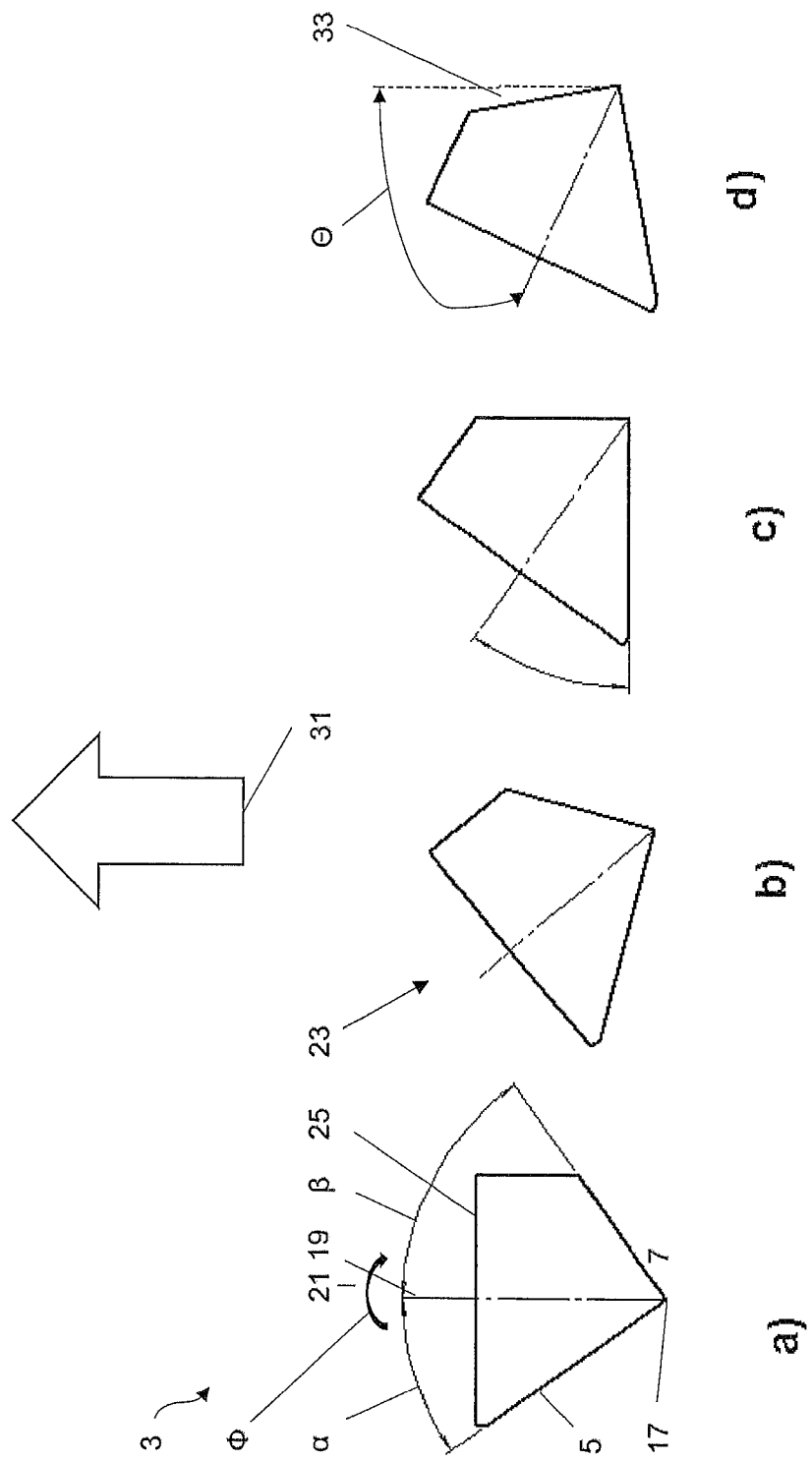
FIG. 2 shows an individual triple, to explain an undercut.

FIG. 2 shows a top view of an individual triple 3 of a retroreflector 1 as in FIG. 1. In FIG. 2 a), a triple without a tilt is shown. The axis of symmetry 19 is collinear with a normal line vector of a plane 25 of the triple according to FIG. 1. A possible rotation 21 of the triple 3 about the axis 19 is indicated by an arrow having the reference symbol of the angle of rotation Φ. The angle α of the first side surface 5 relative to the axis of symmetry 19 of the triple 3 amounts to 35.26°. The angle β of the second side surface 7 relative to the axis of symmetry 19 of the triple 3 corresponds to the angle of the diagonal of a cube and amounts to 54.74°. The sum of α and β and thereby the intersection angle of the first side surface 5 with the second side surface 7 amounts to precisely 90°. The third side surface 9 lies in the plane of the drawing here and also encloses a right angle with the two other side surfaces 5, 7.

FIGS. 2 *b*) to *d*) show the triple with three different tilt angles Θ. In FIG. 2 *b*) the tilt angle Θ is less than 54.74°; in FIG. 2 *c* the tilt angle Θ amounts to precisely 54.74°. In other words, the first side surface 5 lies coplanar to the plane 25 of the triple. In FIG. 2 *d*), the tilt angle Θ is greater than 54.74°. It is understood that the triples can also be rotated 21 and tilted 23 in combined manner.

The triples 3 shown in FIGS. 2 *b*) and 2 *c*) can be unmolded from an imaginary die in an unmolding direction 31, without undercut. The triple 3 shown in FIG. 2 *d*) has an undercut 33. The region indicated with 33 is perpendicular to the unmolding direction 31, counter to unmolding. The triple shown in FIG. 2 *d*) can therefore be unmolded only if it consists, according to the invention, of an elastic material, for example silicone.

Figure 3:
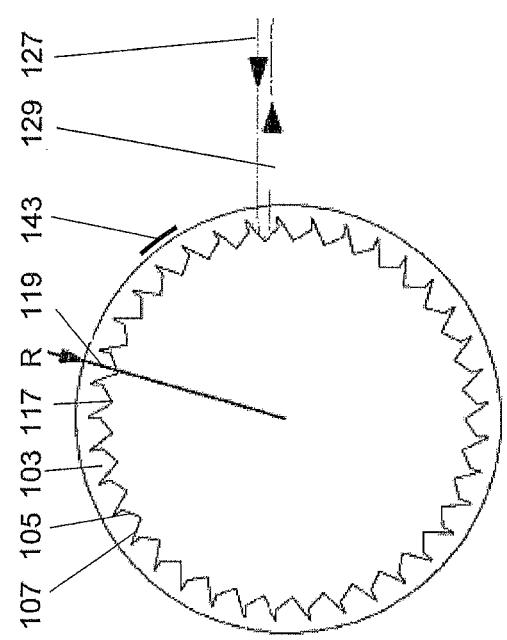
FIG. 3 shows an exemplary retroreflection on curved surfaces.

FIG. 3 shows, as an example, retroreflection at a curved surface 135. In the view of FIG. 3, only two of the side surfaces 105, 107 of the triples 103 are shown. Incident light 127 first impacts the first side surface 105, is reflected there, and then impacts the second side surface 107 and is reflected there. Reflection at the third side surface 109 is not shown. The sequence of impact of the incident light beam 127 on the side surfaces 105, 107, 109 can be permuted as desired. In FIG. 3, the region of the light entry surface that precisely illuminates one triple 103 is indicated with an arrow as aperture 143. Because the surface 135 is curved, the aperture 143 is also curved. In order for the offset not to bring about a change in direction of the reflected beam 129 relative to the incident beam 127 during retroreflection of the light beam, the radius of the sphere or, in general, the local radius of curvature of the curved surface 135 must be greater than the greatest edge length of the triple at least by a factor of 10, preferably at least by a factor of 50, particularly preferably at least by a factor of 100. Furthermore, it is shown, as an example, that the axis 119 of the triple 103 points in the radial direction R.

Figure 4:
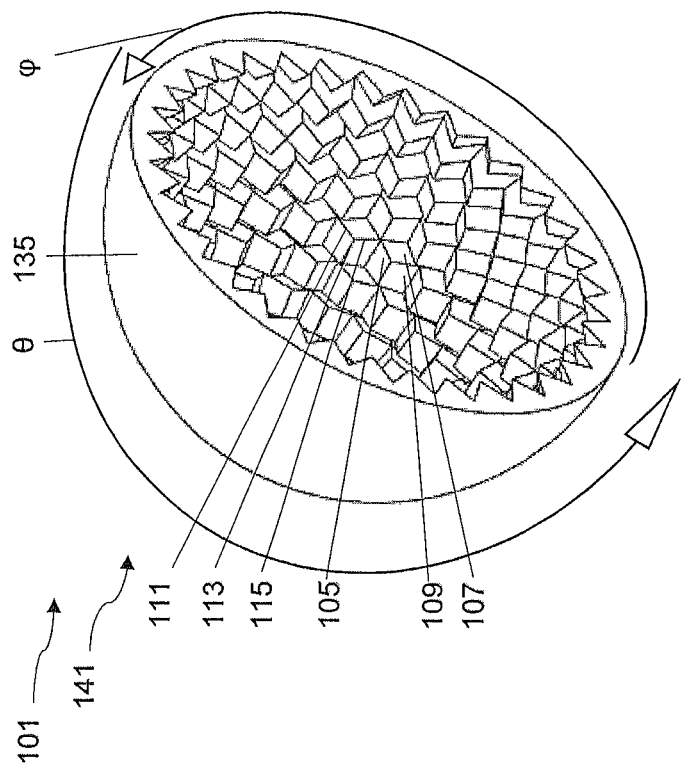
FIG. 4 shows an example of a retroreflective hemisphere.

FIG. 4 shows the view of the retroreflector 101 in the form of a retroreflective hemisphere 141. The curved surface 135 therefore has a spherical shape. The curved surface 135 can consequently be represented by a sphere coordinate system having a radial vector R (see FIG. 3), a polar angle φ, and an azimuth angle θ. Therefore two curvature directions are present. In this view, all the side surfaces 105, 107, 109 of a triple 103 as well as the first, second, and third edges 111, 113, 115 can be seen. The edges 111, 113, 115 intersect in the apex 117. The triples 103 are clearly shown too large in the drawing, in relation to the hemisphere radius, for reasons of recognizability. If one puts two such components together at the circumference, a reflective full sphere occurs, which reflects approximately at the spatial angle 4π. Such spheres, having a suitable diameter, can also be used as operation markers, for example.

Figure 6:
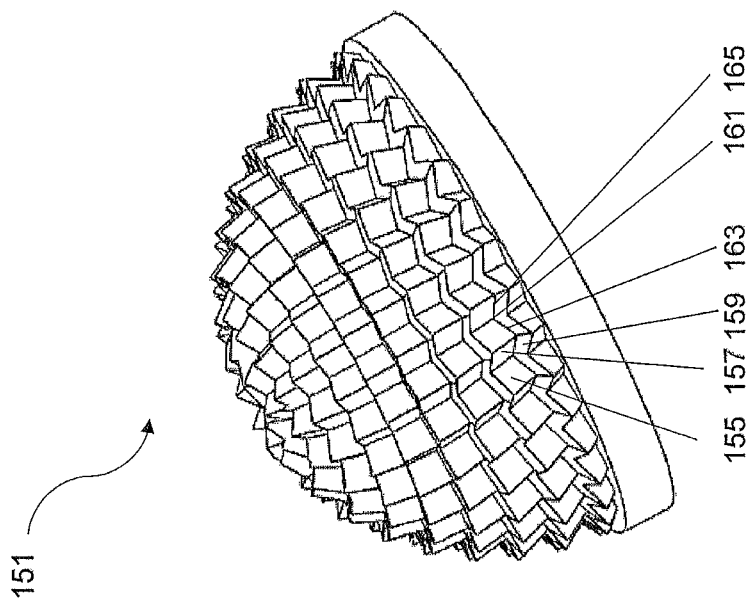
FIG. 6 shows a mold insert for a hemisphere according to FIG. 4 in a view at a slant from the front.
Figure 5:
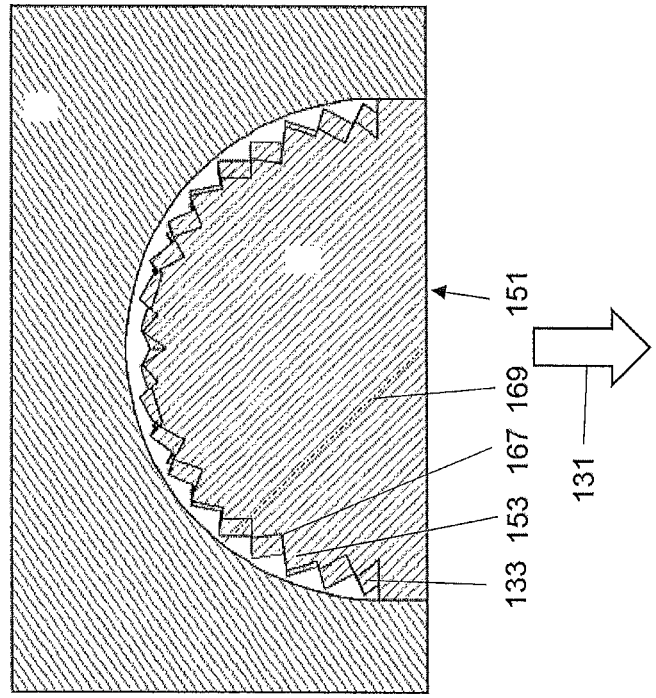
FIG. 5 shows a mold insert for a hemisphere according to FIG. 4 in the closed state.

FIGS. 5 and 6 show a mold having a mold insert 151 for the production of a retroreflector 101 from FIG. 4. The first forming surface 155 of a triple 153 of the mold insert 151 corresponds to the first side surface 105 of a triple 103 of the retroreflector 101. The reference symbols of the mold insert 151 differ from the reference symbols of the retroreflector 101 by 50, in each instance. The same holds true analogously for the second and third forming surfaces 157 and 159, the first, second, and third edges 161, 163, 165, the triple center 167, and the axis of symmetry 169 of the triple 153.

In FIG. 5, the mold is shown in a closed state. An unmolding direction 131 is perpendicular to the flat base surface of the mold die. Undercuts 133 can be clearly seen in the lower region, close to the base plate of the mold die. For reasons of clarity, a heating system for the mold, which is required for curing the silicone, was left out of the drawing.

FIG. 6 shows the mold insert in the open state.

Figure 7:
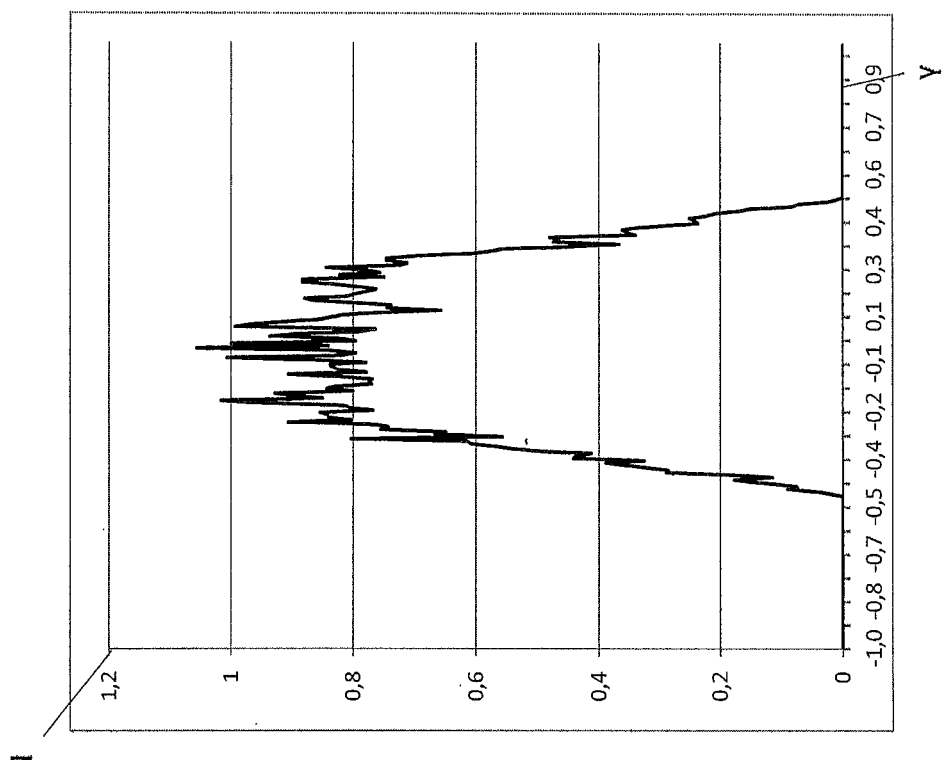
FIG. 7 shows typical angle distributions for triples on a level surface or a curved surface.
Figure 7:
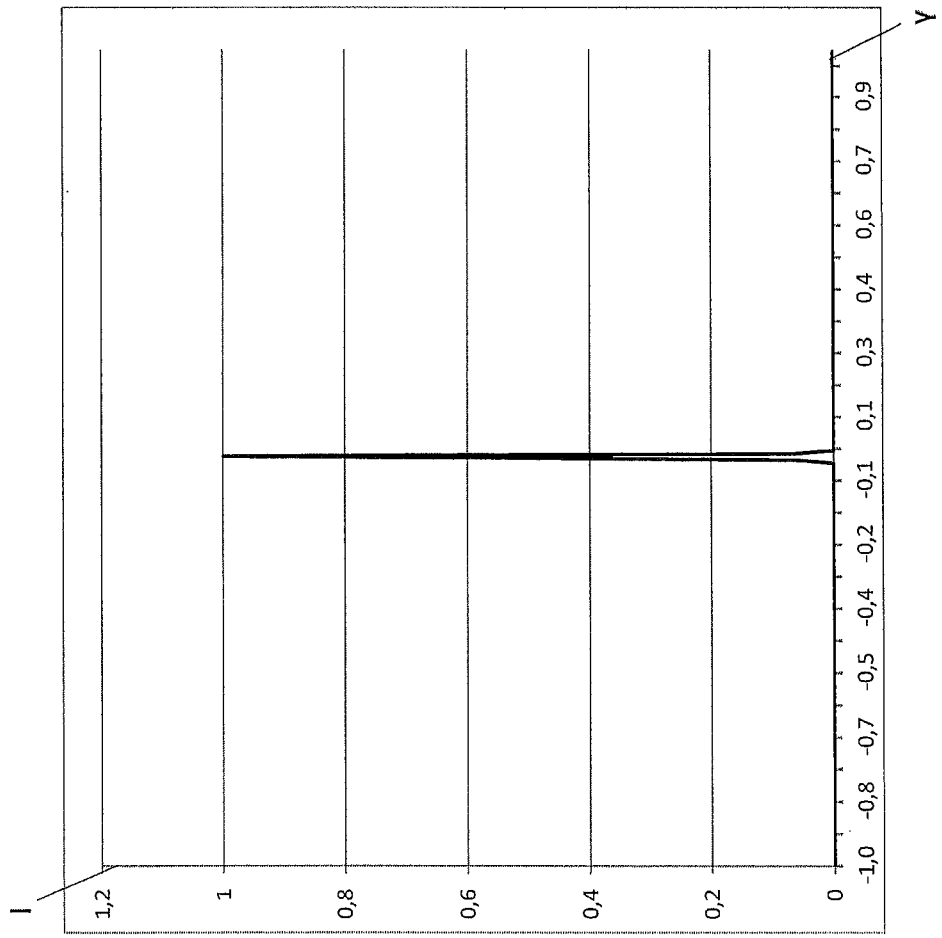

In FIG. 7, an intensity distribution I is plotted above an observation angle γ in arbitrary units. FIG. 7 *a*) shows the angle distribution of the retroreflected light in the case of an ideal triple and a flat aperture surface. The peak width at half height is zero, except for any resolution due to the representation. FIG. 7 *b*) shows the angle distribution for the same ideal triple but with a curved aperture surface 143 (see FIG. 3). Here, the curvature radius is selected in such a manner that approximately a peak width at half height of the angle distribution of 0.5° is obtained.

Figure 8:
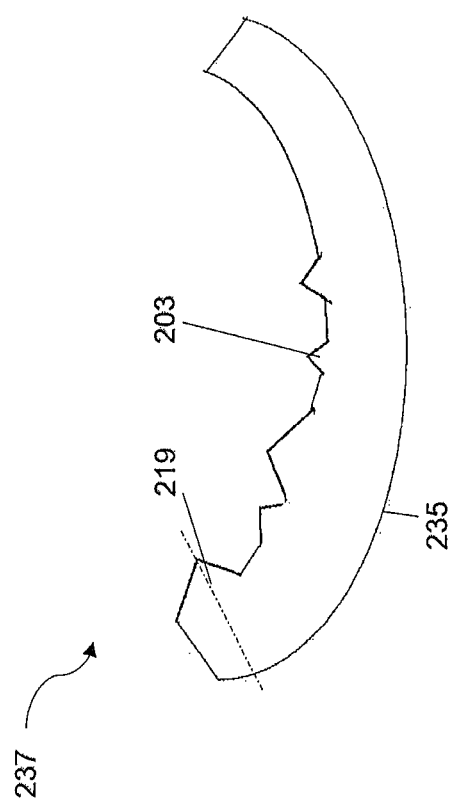
FIG. 8 shows application of an elastic reflector to a curved surface.
Figure 8:
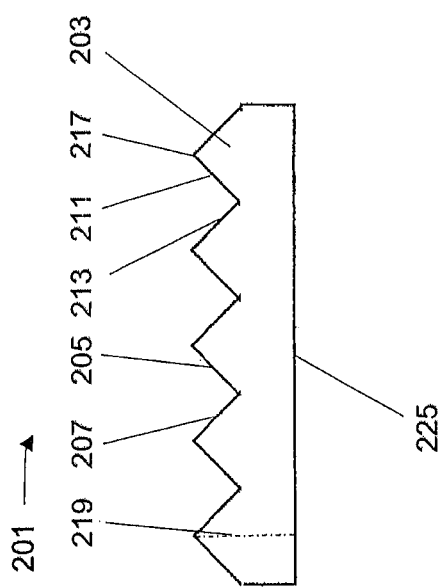

FIG. 8 symbolically shows adaptation of an elastic retroreflector 201, shown in two dimensions, and injection-molded in a flat plane, to a curved surface 235 of an object 237. FIG. 8 *a*) shows the retroreflector 201, in this regard, before it is applied to the object 237. FIG. 8 *b*) shows the retroreflector 201 and the object 237 after application of the retroreflector. In FIG. 8, in particular, the sizes of the triples 203 are shown with great exaggeration. As a result, the deformations, in particular of the triples 203, are shown with great exaggeration in FIG. 8 *b*). In reality, a local curvature radius of the curved surface 235 is greater than the edge lengths or the widths across flats of the triples 203 by at least a factor of 50, even better by at least a factor of 100.

In FIG. 8, due to the symbolic two-dimensional representation, only two side surfaces 205, 207 or two edges, namely first and second edges 211, 213 of a triple 203 are shown in the drawing, in each instance. The edges intersect at the apex 217. The axis of symmetry 219, which passes through the apex 217 and encloses the same angle with the first and second side surfaces 205, 207, lies parallel to the normal line vector of a plane 225 in FIG. 8 *a*), in other words before the elastic retroreflector 201 is affixed to the object 237. The plane 225 corresponds to a flat wall in an injection-molding mold, not shown. After application, the axis of symmetry 219 follows the curved surface 235 of the object 237 in the example of FIG. 8 *b*). The elastic deformations of the retroreflector 201, shown in exaggerated manner in FIG. 8 *b*), can have a negative effect on the reflection behavior of the reflector, on the one hand, but on the other hand can also be used to achieve a desired angle distribution, for example.

Figure 9:
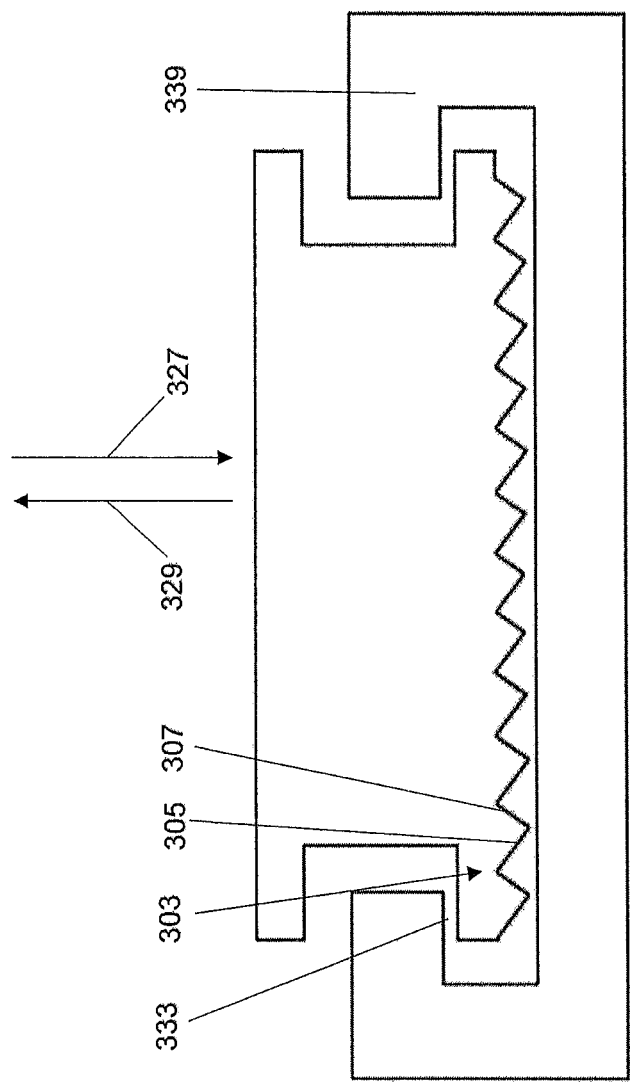
FIG. 9 shows a schematic representation of a retroreflector.

FIG. 9 shows a schematic 2D representation of a retroreflector 301 according to the invention, which is intended for use in a sensor device, in which ultraviolet light emitted from a light source, not shown, in other words an incident beam 327, for example having a wavelength of 280 nm, is guided to a light recipient, not shown, as a retroflected beam 329. The retroreflector 301 has an arrangement of triples 303, each having three side surfaces that stand almost perpendicular on one another, of which a first side surface 305 and a second side surface 307 are shown.

The retroreflector 301 in FIG. 9 is not curved, in other words it is configured to be flat. Nevertheless, the elastic property of silicone can be utilized so as to press an undercut 333 of the retroreflector 301 or preferably a groove, into a holder 339, preferably a rigid holder 339, or to place it over the holder.

At the location of the undercut 333 or the groove, the retroreflector 301 can be attached to the holder. Thanks to the elastic material of the silicone, a closed rear surface can be created in this way. It is therefore possible to do without welding.

Although only a few embodiments of the present invention have been shown and described, it is to be understood that many changes and modifications may be made thereunto without departing from the spirit and scope of the invention.

What is claimed is:

1. A forming die for the producing a retroreflector, wherein the retroreflector comprises an arrangement comprising a plurality of mirrored or totally reflective triples, each triple having first, second, and third side surfaces perpendicular to each other; wherein the first, second, and third side surfaces are disposed as cube corners; and wherein the retroreflector is produced by injection molding from a carrier material comprising an optically transparent silicone resin;

wherein the forming die comprises:

a die body delimited by a die surface;

wherein the die surface has a plurality of triples;

wherein each triple has first, second, and third forming surfaces that border on one another and intersect one another at an angle between 85° and 95°;

wherein the first, second, and third forming surfaces of each triple come together in a triple center;

wherein an axis of symmetry of the respective triple extends through the triple center;

wherein the die body is heated; and wherein the triples of the die body have undercuts perpendicular to an unmolding direction that counter unmolding.

2. The forming die according to claim 1, wherein the forming die is produced by micro-cutting or by galvanic forming of a microsection.

* * * * *